United States Patent
Medalsy

(10) Patent No.: US 11,169,067 B2
(45) Date of Patent: Nov. 9, 2021

(54) METHODS AND SYSTEMS FOR DETERMINING VISCOSITY OF PHOTO-CURING RESIN FOR VAT PHOTOPOLYMERIZATION PRINTER

(71) Applicant: NEXA3D INC., Ventura, CA (US)

(72) Inventor: Izhar Medalsy, Ventura, CA (US)

(73) Assignee: NEXA3D INC., Ventura, CA (US)

( * ) Notice: Subject to any disclaimer, the term of this patent is extended or adjusted under 35 U.S.C. 154(b) by 0 days.

(21) Appl. No.: 16/949,905

(22) Filed: Nov. 19, 2020

(65) Prior Publication Data

US 2021/0156779 A1    May 27, 2021

Related U.S. Application Data

(60) Provisional application No. 62/941,653, filed on Nov. 27, 2019.

(51) Int. Cl.
| | |
|---|---|
| *G01N 11/00* | (2006.01) |
| *B29C 64/264* | (2017.01) |
| *B29C 64/232* | (2017.01) |
| *B29C 64/245* | (2017.01) |
| *B33Y 30/00* | (2015.01) |

(52) U.S. Cl.
CPC ............ *G01N 11/00* (2013.01); *B29C 64/232* (2017.08); *B29C 64/245* (2017.08); *B29C 64/264* (2017.08); *B33Y 30/00* (2014.12); *G01N 2011/006* (2013.01)

(58) Field of Classification Search
None
See application file for complete search history.

(56) References Cited

U.S. PATENT DOCUMENTS

| | | | |
|---|---|---|---|
| 10,016,938 B2 | 7/2018 | Desimone et al. | |
| 2019/0061236 A1 | 2/2019 | Rantala et al. | |
| 2019/0160733 A1 | 5/2019 | Mirkin et al. | |
| 2019/0202112 A1 | 7/2019 | Gmeiner | |
| 2020/0055251 A1 | 2/2020 | Medalsy | |
| 2020/0147881 A1 | 5/2020 | Medalsy et al. | |
| 2020/0338830 A1* | 10/2020 | Deetz | B29C 64/245 |
| 2021/0031458 A1* | 2/2021 | Ong | B29C 64/393 |

FOREIGN PATENT DOCUMENTS

| | | |
|---|---|---|
| WO | 2015/074088 A2 | 5/2015 |
| WO | 2016/078838 A1 | 5/2016 |

OTHER PUBLICATIONS

International Search Report and Written Opinion dated Mar. 10, 2021, from the ISA/European Patent Office, for International Patent Application No. PCT/US2020/061382 (filed Nov. 19, 2020), 11 pgs.

* cited by examiner

*Primary Examiner* — Timothy Kennedy
(74) *Attorney, Agent, or Firm* — Ascenda Law Group, PC

(57) ABSTRACT

Methods and systems for forming 3D articles by vat photopolymerization processes in which resin viscosities are determined both prior to the commencement of the build process and, optionally, during the build process by measuring the torque required to raise and lower a build plate within the resin in the vat. The resin may be heated, and its viscosity thereby altered, by heating the resin in the vat using a light engine employed for fabricating the 3D articles.

15 Claims, 2 Drawing Sheets

METHODS AND SYSTEMS FOR DETERMINING VISCOSITY OF PHOTO-CURING RESIN FOR VAT PHOTOPOLYMERIZATION PRINTER

RELATED APPLICATIONS

This is a NONPROVISIONAL of, claims priority to, and incorporates by reference U.S. Provisional Application No. 62/941,653, filed 27 Nov. 2019.

FIELD OF THE INVENTION

The present invention relates to additive manufacturing processes and, in particular, to methods and systems for determining viscosity of photo-curing resins used in vat polymerization printers.

BACKGROUND

Additive manufacturing, or 3D printing as it is known, is a collection of different technologies that provide different means of direct production of various articles. One such technology is vat photopolymerization, which includes stereolithography (SLA), direct light processing (DLP), and liquid crystal display (LCD) direct printing. These techniques generally involve the selective curing of resins contained in a vat using (typically) ultraviolet (UV) light sources. The resin is cured layer by layer so that the article under manufacture is created through a successive series of cross-sections that adhere to one another.

It is known that in these layer-by-layer printing process, resin viscosity is an important parameter. Viscosity represents the internal resistance of a fluid to motion, that is, the fluid's resistance to deformation. Thicker fluids have a higher viscosity. For example, the viscosity of oil is higher than that of water. For vat photopolymerization processes, low viscosity resins are generally desirable as they allow for relatively rapid replenishment in a build area between layer formations. However, articles formed from low viscosity resins tend to undergo shrinkage and warping during post-curing solidification. Hence, higher viscosity resins are desirable as they do not suffer from such undesirable side effects (at least not to the same degree as the lower viscosity resins). Higher viscosity resins may also produce more desirable article characteristics, on par with those formed from injection molding processes.

Viscosity is caused by the cohesive forces between the molecules of a liquid and it varies with temperature. For liquids, viscosity ($\mu$) may be approximated as $\mu = a10^{b/(T-c)}$, where T is absolute temperature and a, b, and c are experimentally determined constants. Thus, it is known that heating high viscosity resins, which may be otherwise difficult to process in a vat photopolymerization printer, lowers their viscosities, making such resins more amenable to use in such apparatus. WO 2015/074088 proposes heating the resin using a resistive heating element at the edge of the exposure zone. WO 2016/078838 proposes heating the resin using a transparent, electrically conductive coating at the bottom of the vat. US 2019/0202112 proposes heating the resin using an independent (from the light source) electromagnetic radiation source. Also known are vat photopolymerization apparatus which dispose the vat in a furnace-like enclosure within which the entire build process takes place.

SUMMARY OF THE INVENTION

In one embodiment, the present invention provides a method for determining viscosity of a photo-curing resin used in vat photopolymerization printer. Prior to commencing a build process using a vat photopolymerization printer, a tank of the vat photopolymerization printer is filled with resin and a build plate of the vat photopolymerization printer is lowered into the resin. A motor is engaged to raise the build plate within the resin, and a measure of a torque required to raise the build plate is recorded by a torque meter. Using the measure of the torque, a table that tabulates measures of torque with known viscosities of resins is indexed to determine a viscosity of the resin in the tank of the vat photopolymerization printer. The torque meter may be integral to the motor and may be configured to convert torque into an electrical signal. In some cases, the torque meter may include a rotary torque sensor that is in-line with a lead screw adapted to raise and lower the build plate under action by the motor. Such a rotary torque sensor may be an optical or surface acoustic wave (SAW) torque sensor. Also, in some instances, the controller may be, in part, configured as the torque meter. When the measure of the torque is between two tabulated values of resin viscosity in the table, the viscosity of the resin in the tank of the vat photopolymerization printer may be determined as a nearest tabulated value of viscosity for the measure of the torque, or, alternatively, as an interpolated value of viscosity for the measure of the torque.

During the build process, a current viscosity of the resin in the tank of the vat photopolymerization printer may be determined by raising and/or lowering the build plate in the resin using the motor, recording a current measure of a torque required to raise and/or lower the build plate by the torque meter, and determining using a current table look-up the current viscosity of the resin of the resin in the tank. Also, during the build process, a current viscosity of the resin in the tank of the vat photopolymerization printer may be altered or controlled using a light source of the photopolymerization printer (e.g., to heat the resin). While altering the current viscosity of the resin in the tank of the vat photopolymerization printer, the current viscosity of the resin may be measured by raising and/or lowering the build plate in the resin using the motor, recording a current measure of a torque required to raise and/or lower the build plate by the torque meter, and determining using a current table look-up the current viscosity of the resin of the resin in the tank.

In one embodiment of the invention, a system for determining viscosity of a photo-curing resin used in a photopolymerization printer may thus include a vat photopolymerization printer having a tank configured to hold a volume of resin; a build plate configured to be raised and lowered within the tank; a motor coupled to raise and/or lower the build plate; a torque meter configured to measure a torque required to raise and/or lower the build plate in the resin; and a controller configured to operate said motor to raise and/or lower the build plate in the resin, to receive said measure from said torque meter, and to determine a viscosity of the resin in the tank of the vat photopolymerization printer by indexing, using the measure of the torque, a table that tabulates measures of torque with known viscosities of resins. The system may also have a light engine.

BRIEF DESCRIPTION OF THE DRAWINGS

The present invention is illustrated by way of example, and not limitation, in the figures of the accompanying drawings, in which.

DETAILED DESCRIPTION

Disclosed herein are methods and systems for forming 3D articles by vat photopolymerization processes in which resin viscosities are determined both prior to the commencement of the build process and, optionally, during the build process by measuring the torque required to raise and lower a build plate within the resin in the vat. The resin may be heated, and its viscosity thereby altered, by heating the resin in the vat using the light engine employed for fabricating the 3D articles, by an independent (of the light source) heater, or by other means.

Figure 1:
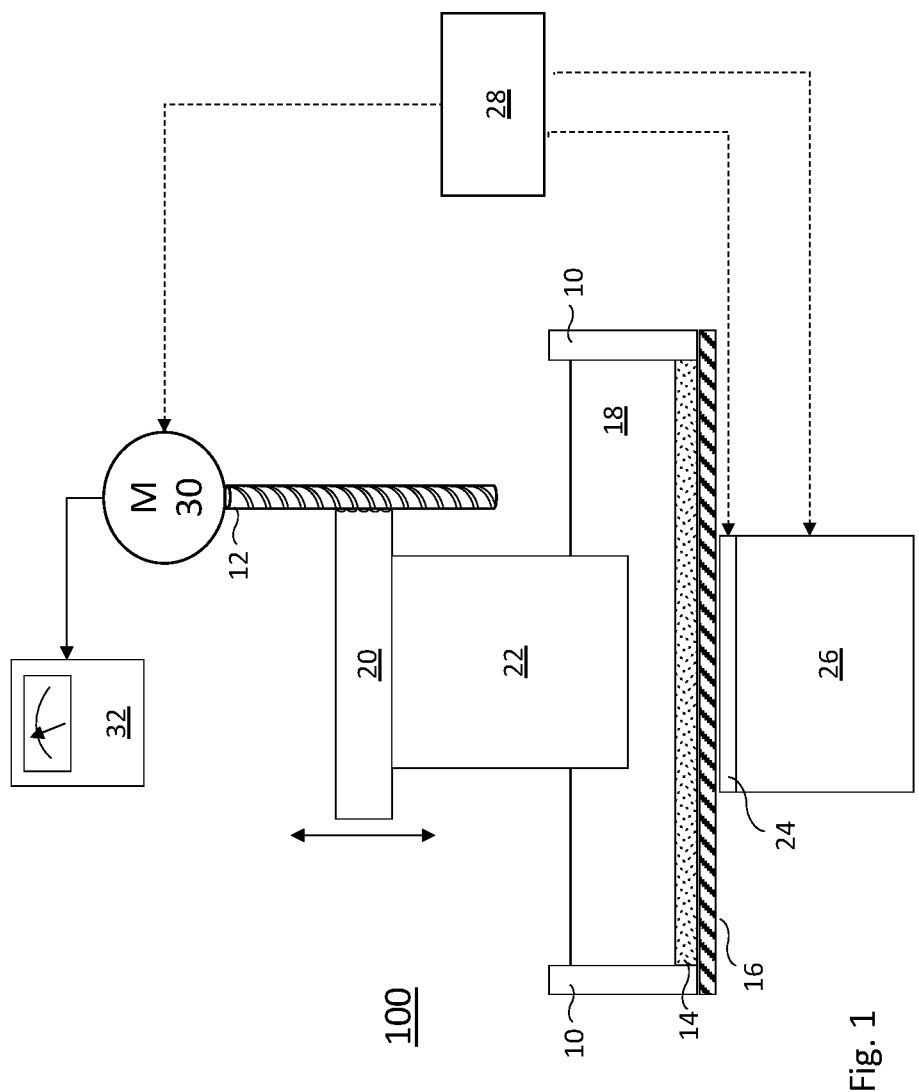
FIG. 1 depicts a schematic cross-section of a 3D printing system configured in accordance with an embodiment of the present invention in which an object undergoes fabrication in a tank containing a photo-curing liquid resin.

FIG. 1 depicts a cross-section of 3D printing system 100 configured in accordance with an embodiment of the present invention, in which electromagnetic radiation (e.g., UV light) is used to cure a photo-curing liquid resin (typically a liquid polymer) 18 in order to fabricate an object (e.g., a 3D object) 22. Object 22 is fabricated layer by layer (i.e., a new layer of object 22 is be formed by photo-curing a layer of liquid polymer 18 adjacent to the bottom surface of object 22), and as each new layer is formed the object may be raised by build plate 20, allowing a next layer of photo-curing liquid resin 18 to be drawn under the newly formed layer. This process may be repeated multiple times to form additional layers until fabrication of the object is complete.

The 3D printing system 100 includes tank 10 for containing the photo-curing liquid resin 18. The bottom of tank 10 (or at least a portion thereof) is sealed (i.e., to prevent the photo-curing liquid polymer 18 from leaking out of tank 10) by a flexible membrane 14, which is transparent (or nearly so) at wavelengths of interest for curing of the resin to allow electromagnetic radiation from a light source 26 to enter into tank 10. A mask 24 (e.g., a liquid crystal layer) is disposed between light source 26 and the photo-curing liquid resin 18 to allow the selective curing of the liquid resin (which allows the formation of 3D object into desired shapes/patterns). In various embodiments, collimation and diffusion elements such as lenses, reflectors, filters, and/or films may be positioned between mask 24 and light source 26. These elements are not shown in the illustrations so as not to unnecessarily obscure the drawing.

A platen or backing member 16 formed of borosilicate glass or other material is disposed between the mask 24 and the flexible membrane 14 and provides structural support. The platen is also transparent (or nearly so) at the one or more wavelengths of interest for curing the resin. In other instances, platen 16 may be metal or plastic and include a transparent window to allow electromagnetic radiation from light source 26 to enter into tank 10. In other embodiments, the mask 24 itself may be used in place of a separate window and its perimeter sealed with a gasket. Note that although the mask 24, platen 16, and membrane 14 are shown as being displaced from one another by some distance, in practice these components may be positioned so as to touch one another, so as to prevent refraction at any air interfaces. Flexible membrane 14 is secured to the edges of tank 10 or to a replaceable cartridge assembly (not shown) so as to maintain a liquid-tight perimeter at the edges of the tank or other opening ("liquid-tight" meaning that the tank does not leak during normal use).

When fabricating a layer of object 22 using 3D printing system 100, electromagnetic radiation is emitted from radiation source 26 through mask 24, platen 16, and membrane 14 into tank 10. The electromagnetic radiation forms an image on an image plane adjacent the bottom of object 22. Areas of high (or moderate) intensity within the image cause curing of localized regions of the photo-curing liquid resin 18. The newly cured layer adheres to the former bottom surface of object 22 and substantially does not adhere to the bottom surface of tank 10 due to the presence of flexible membrane 14. After the newly cured layer has been formed, the emission of electromagnetic radiation may temporarily be suspended (or not, as in the case of "continuous printing") while the build plate 20 is raised away from the bottom of the tank so that another new layer of object 22 may be printed.

The build plate 20 may be raised and lowered by the action of a motor (M) 30, which drives a lead screw 12 or other arrangement. Rotation of the lead screw 12 due to rotation of the motor shaft causes the build plate 20 to be raised or lowered with respect to the bottom of the tank 10. In other embodiments, a linear actuator or other arrangement may be used to raise and lower the build plate 20.

Figure 2:
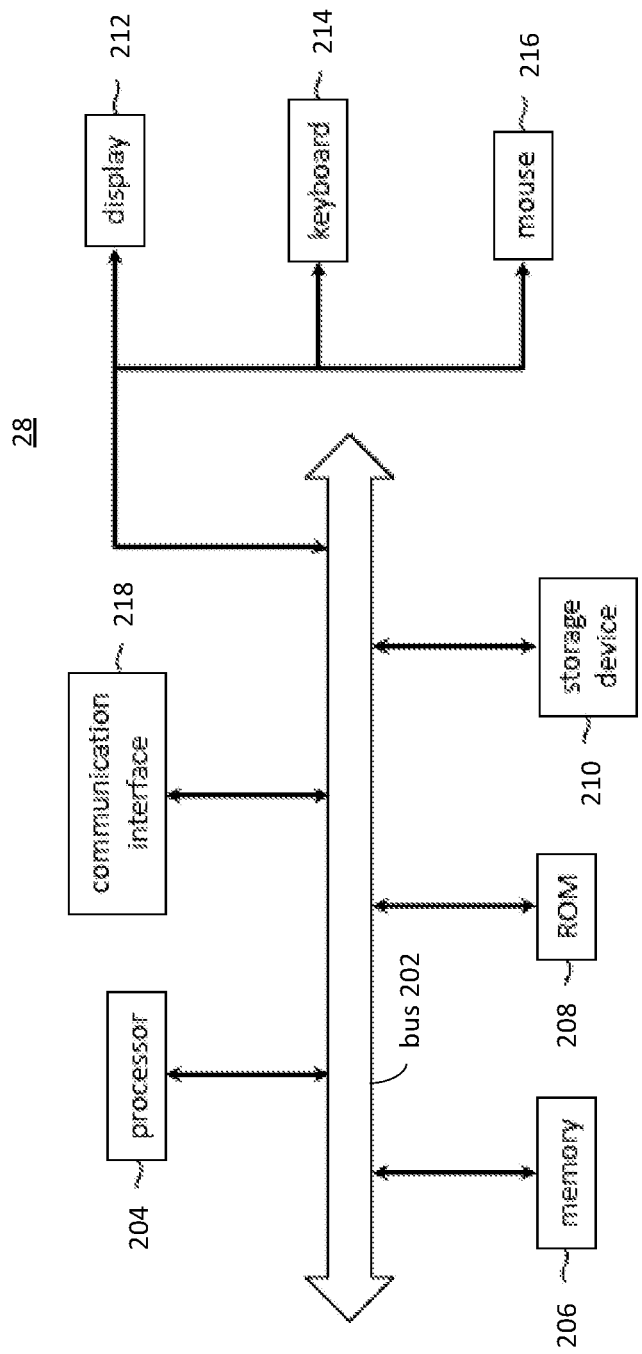
FIG. 2 depicts an example of a controller for the 3D printing system illustrated in FIG. 1.

Aspects of the printing process are directed by a controller 28, which may be implemented as a processor-based system with a processor-readable storage medium having processor-executable instructions stored thereon so that when the processor executes those instructions it performs operations to cause the actions described above. For example, among other things controller 28 may instruct raising/lowering of the build plate 20 via motor 30, activation and deactivation of the light source 26, and the projection of cross-sectional images of the object under fabrication via mask 24. FIG. 2 provides an example of such a controller 28, but not all such controllers need have all of the features of controller 28. For example, certain controllers may not include a display inasmuch as the display function may be provided by a client computer communicatively coupled to the controller or a display function may be unnecessary. Such details are not critical to the present invention.

Controller 28 includes a bus 202 or other communication mechanism for communicating information, and a processor 204 (e.g., a microprocessor) coupled with the bus 202 for processing information. Controller 28 also includes a main memory 206, such as a random access memory (RAM) or other dynamic storage device, coupled to the bus 202 for storing information and instructions (e.g., g-code) to be executed by processor 204. Main memory 206 also may be used for storing temporary variables or other intermediate information during execution of instructions to be executed by processor 204. Controller 28 further includes a read only memory (ROM) 208 or other static storage device coupled to the bus 302 for storing static information and instructions for the processor 204. A storage device 210, for example a hard disk, flash memory-based storage medium, or other storage medium from which processor 204 can read, is provided and coupled to the bus 202 for storing information and instructions (e.g., operating systems, applications programs such as a slicer application, and the like).

Controller 28 may be coupled via the bus 202 to a display 212, such as a flat panel display, for displaying information to a computer user. An input device 214, such as a keyboard including alphanumeric and other keys, may be coupled to the bus 202 for communicating information and command selections to the processor 204. Another type of user input device is cursor control device 216, such as a mouse, a trackpad, or similar input device for communicating direction information and command selections to processor 204 and for controlling cursor movement on the display 212.

Other user interface devices, such as microphones, speakers, etc. are not shown in detail but may be involved with the receipt of user input and/or presentation of output.

Controller 28 also includes a communication interface 218 coupled to the bus 202. Communication interface 218 may provide a two-way data communication channel with a computer network, which provides connectivity to and among the various computer systems discussed above. For example, communication interface 218 may be a local area network (LAN) card to provide a data communication connection to a compatible LAN, which itself is communicatively coupled to the Internet through one or more Internet service provider networks. The precise details of such communication paths are not critical to the present invention. What is important is that controller 28 can send and receive messages and data, e.g., a digital file representing 3D articles to be produced using printer 100 through the communication interface 218 and in that way communicate with hosts accessible via the Internet. It is noted that the components of controller 28 may be located in a single device or located in a plurality of physically and/or geographically distributed devices.

In accordance with aspects of the present invention, prior to commencing a build process using printing system 100, the tank 10 is filled with resin and the build plate 20 is lowered into the resin. Controller 28 engages motor 30 to raise the build plate 20 within the resin, and the torque required to raise the build plate is recorded by torque meter 32. In one embodiment, the torque meter 32 is integral to motor 30 and includes a sensor or transducer that converts torque into an electrical signal. For example, the sensor may be a rotary torque sensor that is in-line with the lead screw 12 that provides a direct measure of the torque required to turn the lead screw in order to move the build plate 20 within the resin. Optical or surface acoustic wave (SAW) torque sensors are two types of sensors well suited for this application. In other embodiments the torque meter may be a function of controller 28, or it may be a stand-alone unit that, like controller 28, is processor-based and which operates under the control of processor-executable instructions stored in a memory or other storage device.

The torque required to displace the build plate within the resin will be proportional to the viscosity of the resin. Less torque is required for low viscosity resins, while higher torque is required for high viscosity resins. The absolute torque required for a given combination of motor and build plate may be determined for a variety of resins of known viscosity and tabulated. The tabulated results may be stored in the form of a table, e.g., in a non-volatile memory of controller 28 or torque meter 32. Then, prior to a build process, when controller 28 engages motor 30 to raise the build plate 20 within the resin, the measured torque required to raise the build plate may be used as an index to the table to determine the viscosity of the resin in tank 10. Where the measured torque is between two tabulated values of resin viscosity, a nearest value of viscosity for the measured torque may be provided, or an interpolated value of viscosity for the measured torque may be provided.

A similar process may be used during the build process. That is, periodically or at other desired times, the viscosity of the resin may be determined using the above table look-up procedure. During a build process it is very likely that the resin viscosity will change inasmuch as the resin is heated during the build process by virtue of being exposed to UV light from the light source 26. The photo-polymerization process is exothermic and produces heat, which heat is transferred (though not necessarily uniformly) throughout the resin in the vat. In some embodiments, a resin circulatory system such as that disclosed in U.S. patent application Ser. No. 16/676,940, which is assigned to the assignee of the present invention, may be employed in order to maintain the temperature of the resin relatively constant over the entire build process.

Prior to the build process, the resin temperature may be varied in order to achieve a desired resin viscosity. For example, the resin circulatory system disclosed in the above-referenced patent application may be used for such purposes. Alternatively, the resin may be heated by activating the light source 26 while maintaining the mask 24 in a darkened state. This darkened state is required so that UV light is not incident into the tank 10 causing the resin to cure. The heat from the light source 26 and the mask 24 itself will be transferred to the resin in the tank and as the resin heats up its viscosity will change. The above procedure for measuring the resin viscosity through measuring the torque required to move the build plate through the resin may be used during this heating process until a desired viscosity is reached, allowing the build process to commence.

By way of example concerning the use of torque to determine resin viscosity, the torque required to raise and lower the build plate in the resin may be expressed as:

$$\text{Torque} = \text{Force} \times [\text{Length} \times \sin(\text{angle})]$$

where the "Length" is the vertical displacement of the lead screw and the "angle" is the rotational angle through which the lead screw is driven for the specified "Length," each of which may be measured. As indicated above, the torque may be determined from the measurement provided by a torque meter, thus the "Force" may be determined as:

$$\text{Force} = \text{Torque} / [\text{Length} \times \sin(\text{angle})]$$

This "Force" may be regarded as the drag force experienced when the build plate is raised/lowered in the resin. The drag force ($F_D$) is related to the density ($\rho$) of the resin by:

$$F_D = \tfrac{1}{2} \rho v^2 C_D A$$

where "v" is the speed of the build plate relative to the resin (which, for purposes of the present invention may be regarded as being at rest during the movement of the build plate), "A" is the cross-sectional area of the build plate, and $C_D$ is a dimensionless drag coefficient of the resin. Resin densities are commonly available from their respective manufacturers and typically in a range of 1.05-1.25 g/cm$^3$. The drag coefficient of individual build plates for different printers may be determined for different resins empirically and tabulated for use. Moreover, common drag coefficients for rectangular flat plates having specified aspect ratios (length:depth) are available in various commercial publications and generally vary between 1.5-2; in the absence of a determined drag coefficient for a particular build plate a value of 1.8 may be used as a good approximation assuming the build plate has a smooth, rectangular surface. Resin densities will vary with temperature, so measurements of drag forces across a temperature spectrum that mimics operational environments should be performed when seeking to tabulate drag coefficients for various build plate and resin combinations.

At low velocities and treating the resin as an incompressible fluid, as would be expected in 3D printing applications, the flow of the resin past the moving build plate is assumed to be laminar, or nearly so. Further, the size of the build plate relative to the object under fabrication (if present) is assumed to be dominant. Hence, the drag force (even during the fabrication of the object) is related to the resin viscosity ($\eta$) as:

$$F_D = a\eta v$$

where "a" is the "size" of the build plate and "v" is its velocity when being raised/lowered in the resin. The "size" of a given build plate may be determined empirically. For example, for a given printer/build plate/resin combination, the drag force may be computed from the measured torque as specified above. Resin manufacturers usually specify resin viscosities at a reference temperature, typically 25° C. Thus, if the torque measurement is taken with the resin at its reference temperature, then the "size" of the build plate may be calculated as:

$$a = \frac{F_D}{\eta v} = \frac{\rho v C_D A}{2\eta}$$

As mentioned above, this size may be regarded as invariant over common object assemblies during printing operations, hence permitting tabulation of different viscosity values for different temperatures as a function of torque.

Thus, methods and systems for determining viscosity of photo-curing resins used in vat polymerization printers have been described.

What is claimed is:

1. A method for determining viscosity of a photo-curing resin used in a vat photopolymerization printer, said method comprising, prior to commencing a build process using the vat photopolymerization printer:

filling a tank of the vat photopolymerization printer with resin and lowering a build plate of the vat photopolymerization printer into the resin;

engaging a motor to raise the build plate within the resin, and recording a first measure of a first torque required to raise the build plate by a torque meter; and referencing, using the first measure of the torque, a table that tabulates measures of torque with known viscosities of resins to determine a first viscosity of the resin in the tank of the vat photopolymerization printer.

2. The method of claim 1, wherein the torque meter is integral to the motor and is configured to convert the first measure of the first torque into an electrical signal.

3. The method of claim 1, wherein the torque meter includes a rotary torque sensor that is in-line with a lead screw adapted to raise and lower the build plate under action by the motor.

4. The method of claim 3, wherein the rotary torque sensor comprises an optical or surface acoustic wave (SAW) torque sensor.

5. The method of claim 1, wherein the controller is, in part, configured as the torque meter.

6. The method of claim 1, wherein when the first measure of the first torque is between two tabulated values of resin viscosity in the table, determining the first viscosity of the resin in the tank of the vat photopolymerization printer as a nearest tabulated value of viscosity for the first measure of the first torque.

7. The method of claim 1, wherein when the first measure of the first torque is between two tabulated values of resin viscosity in the table, determining the first viscosity of the resin in the tank of the vat photopolymerization printer as an interpolated value of viscosity for the first measure of the first torque.

8. The method of claim 1 further comprising, during the build process:

determining a second viscosity of the resin in the tank of the vat photopolymerization printer by raising and/or lowering the build plate in the resin using the motor;

recording a second measure of a second torque required to raise and/or lower the build plate by the torque meter; and determining, using the table look up, the second viscosity of the resin in the tank from the second measure of the second torque.

9. A system for determining viscosity of a photo-curing resin used in a vat photopolymerization printer, the system comprising the vat photopolymerization printer having a tank configured to hold a volume of resin; a build plate configured to be raised and lowered within the tank; a motor coupled to raise and/or lower the build plate; a torque meter configured to measure a torque required to raise the build plate in the resin; and a controller configured to operate said motor to raise and/or lower the build plate in the resin, to receive said measure of the torque from said torque meter, and to determine a viscosity of the resin in the tank of the vat photopolymerization printer by referencing, using the measure of the torque, a table that tabulates measures of torque with known viscosities of resins.

10. The system of claim 9, wherein the torque meter is integral to the motor and is configured to convert torque into an electrical signal.

11. The system of claim 9, wherein the torque meter includes a rotary torque sensor that is in-line with a lead screw coupled to raise and lower the build plate under action by the motor.

12. The system of claim 11, wherein the rotary torque sensor comprises an optical or surface acoustic wave (SAW) torque sensor.

13. The system of claim 9, wherein the controller is, in part, configured as the torque meter.

14. The system of claim 9, wherein the controller is further configured to determine the viscosity of the resin in the tank of the vat photopolymerization printer as a nearest tabulated value of viscosity for the measure of the torque when the measure of the torque is between two tabulated values of resin viscosity in the table.

15. The system of claim 9, wherein the controller is further configured to determine the viscosity of the resin in the tank of the vat photopolymerization printer as an interpolated value of viscosity for the measure of the torque when the measure of the torque is between two tabulated values of resin viscosity in the table.

* * * * *